United States Patent
Cheon et al.

(10) Patent No.: US 9,830,934 B2
(45) Date of Patent: Nov. 28, 2017

(54) PHONOGRAPH RECORD CLEANER

(71) Applicant: Koolance, Inc., Auburn, WA (US)

(72) Inventors: Kioan Cheon, Federal Way, WA (US); AnKuk Song, AnYang-Shi (KR)

(73) Assignee: Koolance, Inc., Auburn, WA (US)

( * ) Notice: Subject to any disclaimer, the term of this patent is extended or adjusted under 35 U.S.C. 154(b) by 340 days.

(21) Appl. No.: 14/210,271

(22) Filed: Mar. 13, 2014

(65) Prior Publication Data
US 2014/0318573 A1    Oct. 30, 2014

Related U.S. Application Data

(60) Provisional application No. 61/785,456, filed on Mar. 14, 2013.

(51) Int. Cl.
*G11B 3/58*    (2006.01)
*B08B 3/12*    (2006.01)

(52) U.S. Cl.
CPC ............. *G11B 3/589* (2013.01); *B08B 3/12* (2013.01)

(58) Field of Classification Search
CPC ................ G11B 3/58–3/589; B08B 3/12
See application file for complete search history.

(56) References Cited

U.S. PATENT DOCUMENTS

| | | |
|---|---|---|
| 3,401,708 A | 9/1968 | Henes |
| D243,382 S | 2/1977 | Mox |
| D247,662 S | 4/1978 | Doyel |
| D248,817 S | 8/1978 | Spencer |
| D252,848 S | 9/1979 | Spencer |
| D254,703 S | 4/1980 | Seres |
| 4,202,071 A | 5/1980 | Scharpf |
| D325,108 S | 3/1992 | Byrne |
| 5,524,313 A | 6/1996 | Sato |
| 6,000,085 A | 12/1999 | Weng |
| 6,021,789 A * | 2/2000 | Akatsu ............... B08B 3/12 134/184 |
| 2006/0061225 A1* | 3/2006 | Beck ............... B01J 19/008 310/341 |
| 2007/0034227 A1* | 2/2007 | Hesch ............... B08B 3/12 134/1 |
| 2007/0267039 A1* | 11/2007 | Sullivan ............... B08B 3/12 134/1 |

FOREIGN PATENT DOCUMENTS

| | | |
|---|---|---|
| JP | S54 89604 A | 7/1979 |
| JP | S54 100701 A | 8/1979 |

(Continued)

OTHER PUBLICATIONS

Machine Translation of JP-S56-5173 (Jan. 20, 1981).*

(Continued)

*Primary Examiner* — Jason Ko
*Assistant Examiner* — Spencer Bell
(74) *Attorney, Agent, or Firm* — DWC Law Firm, P.S.; David Chen (57) ABSTRACT

Methods, systems and apparatus for cleaning phonograph records are disclosed. In some embodiments, a phonograph record can be cleaned in a liquid basin using ultrasonic transducers, wherein the liquid basin has a dampening structure. Also, the ultrasonic transducers are disposed on a flexible wall for reducing vibrations of the cleaner.

9 Claims, 10 Drawing Sheets

(56) References Cited

FOREIGN PATENT DOCUMENTS

| JP | S56 5173 A | 1/1981 |
| JP | S57 27404 A | 2/1982 |

OTHER PUBLICATIONS

"Ultrasonic record cleaning machine," Belldream, <http://belldream.jp/US-60V.html>.
"Vinyl Cleaner—LP Cleaning Machine," Audio Desk Systeme, <http://www.audiodesksysteme.de/index.php?kat=10_17_15>.
"My version of an Ultrasonic Record Cleaner," diyAudio, <http://www.diyaudio.com/forums/analogue-source/218276-my-version-ultrasonic-record-cleaner.html>.
"Wholesale ultrasonic record cleaner," Aliexpress, <http://www.aliexpress.com/w/wholesale-ultrasonic-record-cleaner.html>.

\* cited by examiner

PHONOGRAPH RECORD CLEANER

CROSS REFERENCE TO RELATED APPLICATION(S)

This application claims the benefit of U.S. provisional patent application Ser. No. 61/785,456 (filed Mar. 14, 2013) which is incorporated herein by reference in its entirety.

BACKGROUND

1. Field of the Disclosure

The present disclosure relates to automated cleaners utilizing ultrasonic transducers, and more particularly, to phonograph record cleaners utilizing ultrasonic transducers.

2. Description of Related Art

There are a variety of phonograph record cleaners known in the art. Some record cleaners utilize brushes or other cleaning members that make physical contact with the record. Some of these cleaners are commonly known to lack sufficient cleaning performance in that they are unable to thoroughly clean matter located in the grooves of the record. In addition, repeated use of cleaning implements that are required to make physical contact with the record can wear on the surface of the record.

Some record cleaners include a liquid basis for use in cleaning records. The liquid is often made up of a mixture of water and a proprietary cleaning fluid that is sold along with the record cleaner. If the user of such a record cleaner runs out of proprietary cleaning fluid, more must be purchased in order to continue using the record cleaner.

To overcome the limitations associated with the use of cleaning members, some record cleaners employ ultrasonic transducers to generate ultrasonic frequencies in the liquid, which in turn, generate compression waves in the cleaning liquid. Without being bound by theory, bubbles/cavitation can form as a result of the compression waves, and those bubbles can rapidly compress or implode creating liquid jets small enough to clean small grooves in records.

The amount of power used with an ultrasonic cleaning system can have a substantial impact on the effectiveness of the record cleaner. If the wattage is too low, then the ultrasonic transducers are too weak to adequately clean the record. If the wattage is too high, the surface of the phonograph records can be damaged.

BRIEF SUMMARY

In some embodiments of the present disclosure, a record cleaner comprises a case having an opening within which to place a record. An agitating device, such as an ultrasonic transducer can be provided, and can agitate liquid within a liquid basin. The liquid basin can have a dampening structure positioned near a top portion of liquid basin. The dampening structure can extend downward to a location between a liquid surface position and a record position, within the basin. The dampening structure can help prevent damage to records during liquid agitation.

In some embodiments, the record cleaner comprises a non-rigid flexible wall of the liquid basin, and ultrasonic transducers are attached to the flexible wall. The flexible wall can permit higher power transducers to be used, in part, by lowering vibrations.

In some embodiments, the record cleaner can comprise a user interface for displaying a current period of a washing or drying cycle. The user interface can be used by a user to select a cycle or combination of cycles. The user interface can also allow a user to select a strength for at least one of the cycles.

Various methods, systems and apparatus are also provided for making and using various embodiments of the record cleaner.

DETAILED DESCRIPTION

In the following description, certain specific details are set forth in order to provide a thorough understanding of various embodiments of the disclosure. However, upon reviewing this disclosure, one skilled in the art will understand that the disclosure may be practiced without many of these details. In other instances, well-known structures related to hydraulic equipment, ultrasonic transducers for cleaning, and materials of construction, etc., have not been described in detail to avoid unnecessarily obscuring the descriptions of the embodiments of the disclosure.

In the present description, the terms "about" or "consisting essentially of," and their equivalents, mean±20% of the indicated range, value, or structure, unless otherwise indicated. It should be understood that the terms "a" and "an" as used herein refer to "one or more" of the enumerated components. The use of the alternative (e.g., "or") should be understood to mean either one, both, or any combination thereof of the alternatives. As used herein, the terms "include" and "comprise" are used synonymously, which terms and variants thereof are intended to be construed as non-limiting.

Various embodiments of the present disclosure are described in the context of application to cleaning of vinyl LP phonograph records. However, as will be appreciated by those skilled in the art, the disclosed embodiments can be applicable in other context, such as, for example, cleaning other substrates with delicate surfaces and fine crevices or grooves. In various context described herein, the term fluid may be exchanged with liquid, as will be appreciated by those skilled in the art after reviewing this disclosure.

Figure 1:
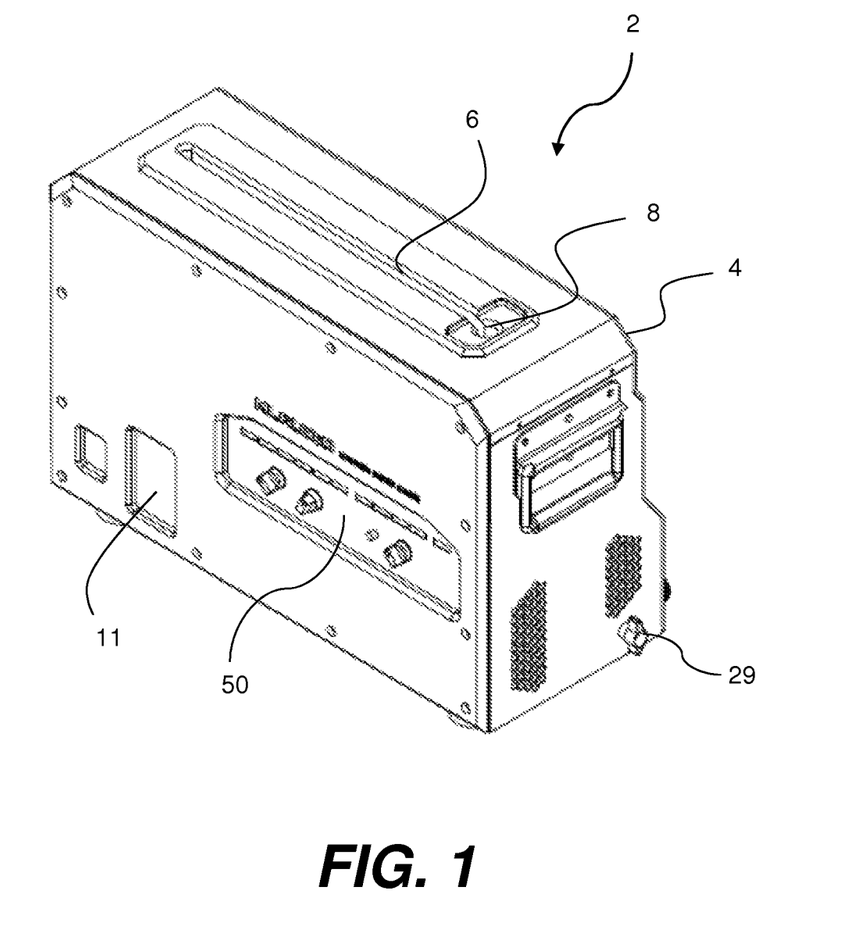
FIG. 1 is a front perspective view of an embodiment of a record cleaner of the present disclosure.

In some embodiments, an ultrasonic phonograph record cleaner (also, "record cleaner") is provided, as illustrated in FIG. 1. The record cleaner 2 can include a casing 4, having a slot 6 into which a user can insert a record 10. A fill hole 8 can also be provided, near an end portion of the slot 6, for use in pour filling a liquid basin and reservoir of the record cleaner.

Figure 2:
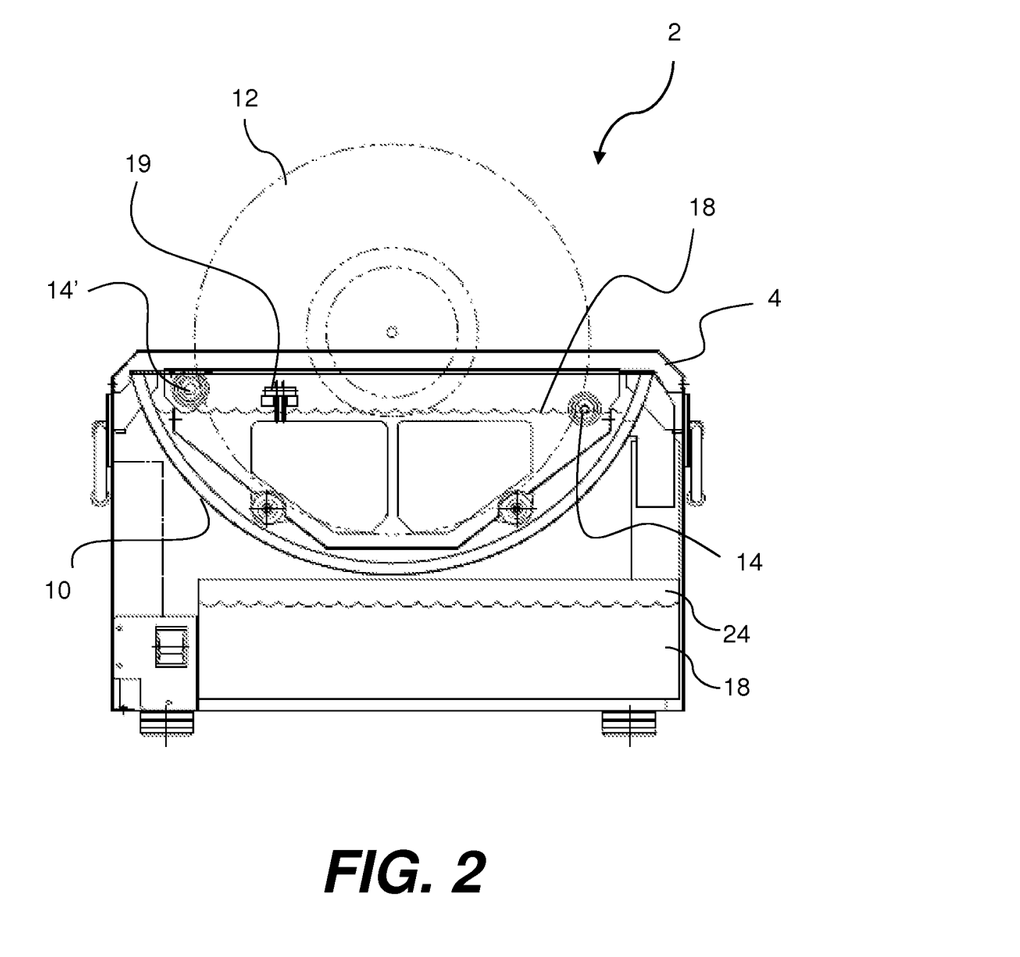
FIG. 2 is a partial side cross-sectional view of the record cleaner of FIG. 1.
Figure 3:
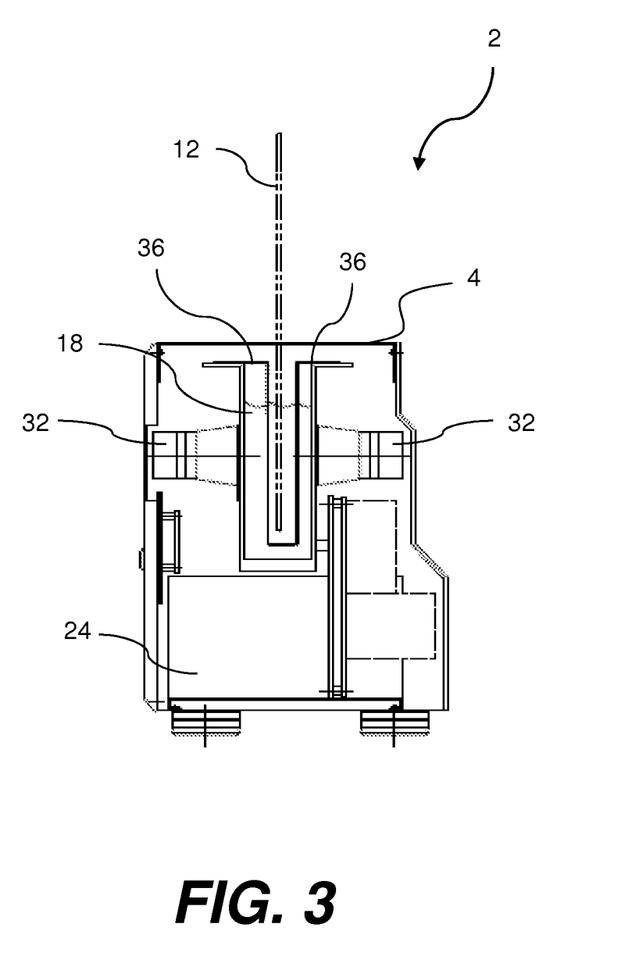
FIG. 3 is a lateral cross-sectional view of the record cleaner of FIG. 1.
Figure 5:
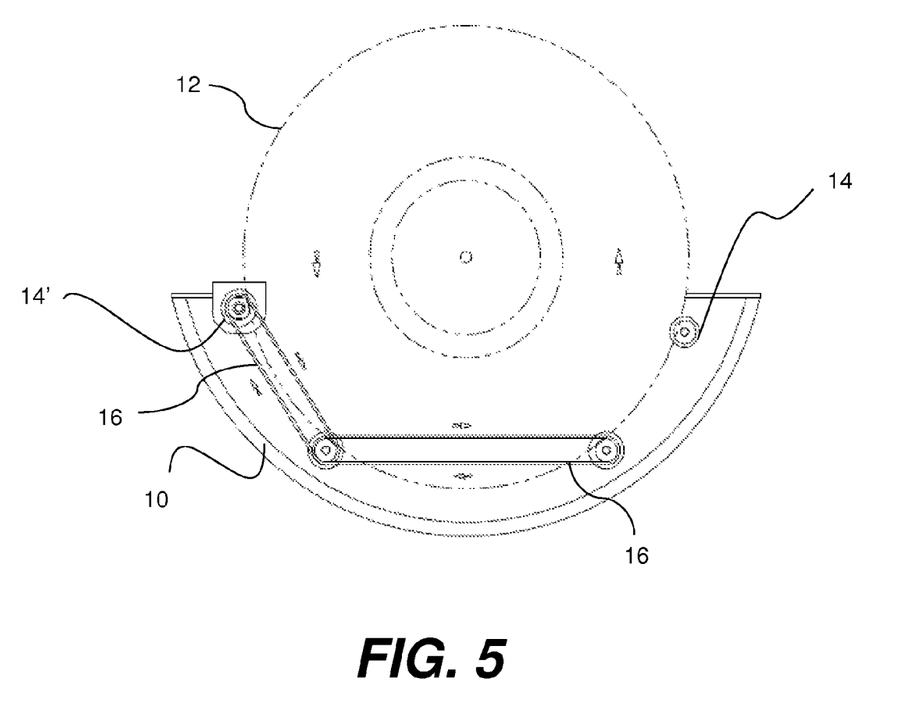
FIG. 5 is a partial side elevation view of the record cleaner of FIG. 1, showing a record disposed within a liquid basin of the recording cleaner, and showing rollers upon which the record can rest, with pulleys connecting the rollers.

Referring to FIGS. 2 & 5, a liquid basin 10, positioned within the casing 4, can have an approximately or exactly half circle cross section. A plurality of rollers 14, 14' including at least one motorized roller 14', can be disposed within the liquid basin 10, connected by flexible members (e.g., cables 16). The rollers can be situated at particular locations within the basin 10, such that the perimeter edges of a record 12 placed within the basis 10 rests on the rollers 14, 14' at a particular height above a bottom of the basin 10. In particular, in some embodiments, the rollers 14, 14' are disposed at positions that maintain a central portion of the record above a maximum liquid-fill level. This can avoid a label on the record 12 from contacting liquid in the basin.

The at least one motorized roller 14' can be manually actuated by a switch to turn the roller 14', which in turn, turns a record 12 resting on the rollers. This can cycle a portion of the record 12 into and out of liquid 18 in the liquid basin 10. In some embodiments, the motorized roller can be connected to at least one other roller 14 by cables 16, to drive the other roller. In some embodiments, one or more rollers 14 are connected to the motorized roller, and one or more rollers are not.

Figure 6:
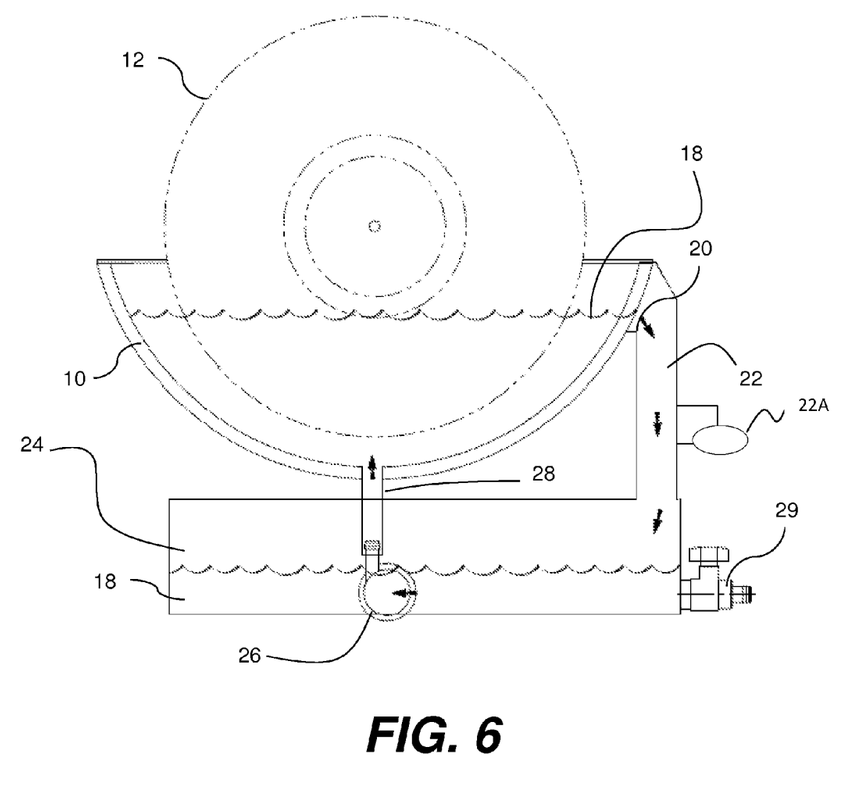
FIG. 6 is a partial side elevation view of the record cleaner of FIG. 1, showing the liquid basin and a connected liquid reservoir, as well as a run-off port.
Figure 7:
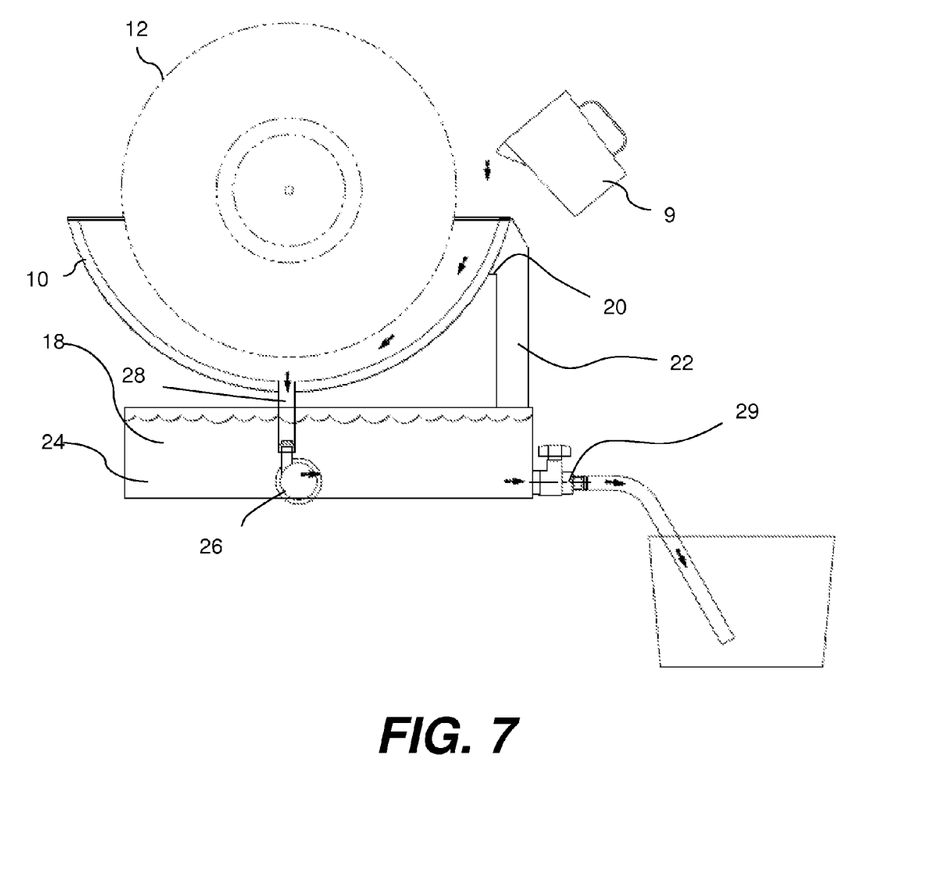
FIG. 7 is shows the record cleaner components of FIG. 6, further including a drainage conduit connected to the reservoir and a container from which the basin and reservoir can be filled.

Turning to FIGS. 1, 6 & 7, liquid (e.g., distilled water) 18, can be poured or run into the liquid basin 10, through the fill hole 8 and slot 6, to fill the basin 10. In some embodiments, a run-off level is provided by a port opening 20 or ledge, into a run-off port 22. In particular, liquid that reaches a predetermined level can drain off the through the port opening 20, down the run-off port 22, into a reservoir 24. In some embodiments (not illustrated), the run-off port 22 can be aligned with the fill hole, or have a connecting port aligned with the fill hole, so that a user can directly fill the liquid basin through the run-off port 22. In some embodiments, this can accommodate a large volume of fluid that is quickly flooded into the system.

In some embodiments, a pump 26 is provided which can be in fluid communication with the reservoir 24 and the basin 10. As will be described further below, an automated or manual cleaning cycle can allow liquid to be drained from the basin 10, into the reservoir, and can also pump liquid from the reservoir 24, up into the basin 10, via pump 26. In some embodiments, the pump 26 is at least partially situated within the reservoir 24, and in other embodiments, it is not. The pump 26 can have a suction end portion of the pump open to receive liquid from the reservoir. A discharge end portion 28 (or a discharge conduit) of the pump 26 can be connected to the liquid basin 10. Also, pump 26 can be configured such that when it is not pumping, water can drain from the basin 10 into the reservoir. In other embodiments, the pump 26 can include an internal valve, or a separate drain line having a valve, which can be actuated to allow liquid to drain from the basin 10, into the reservoir 24. Also, the pump can be actuated to pump liquid from the reservoir 24, into the basin 10. As described previously, a run-off level is provided in the basin to regulate liquid level in the basin 10.

In some embodiments, the run-off level is positioned such that liquid avoids contacting a record label on a central portion of the record resting on the rollers 14, 14', as will be appreciated by those skilled in the art after reviewing this disclosure.

A liquid drain valve 29 (See, FIG. 7) can also be provided to drain off reservoir liquid, when it is desired to change the cleaning liquid.

Figure 4:
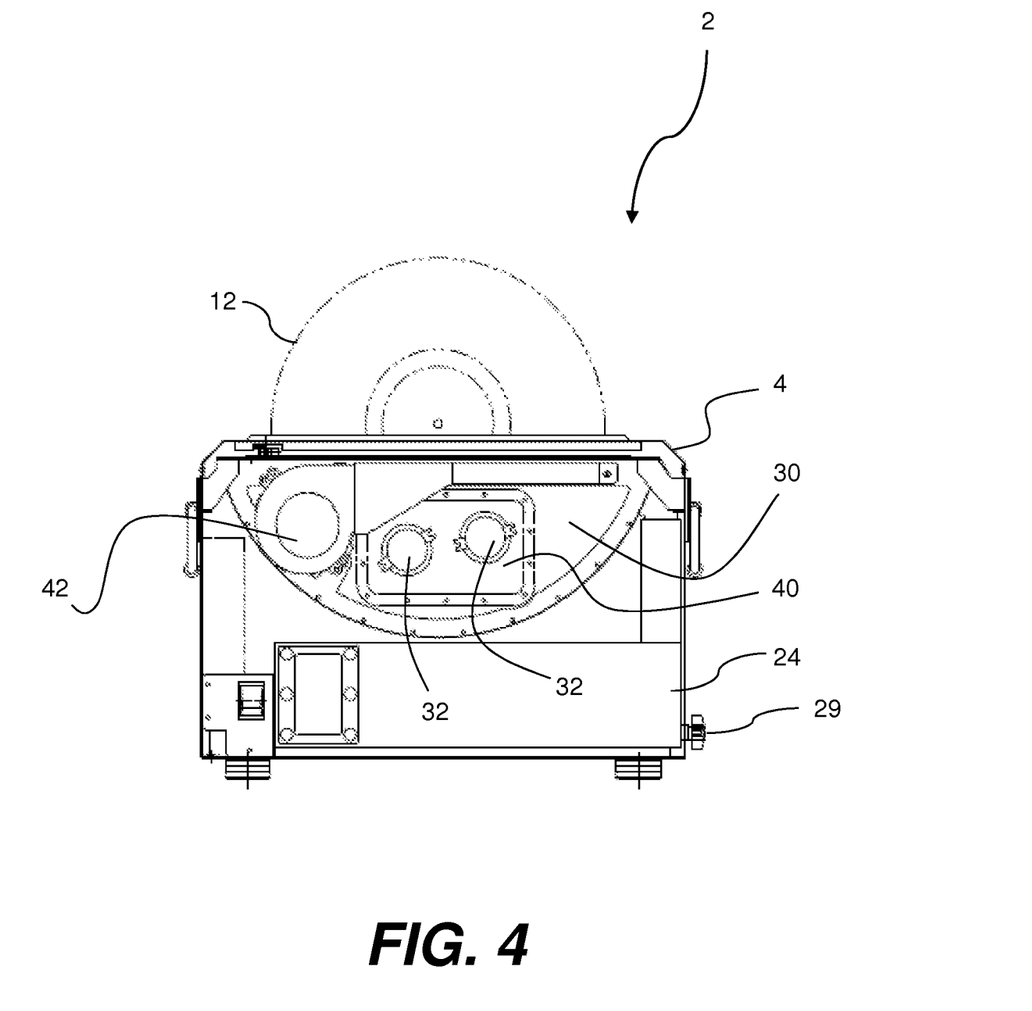
FIG. 4 is another side cross-sectional view of the record cleaner of FIG. 1, as viewed from a different depth from FIG. 2.
Figure 8:
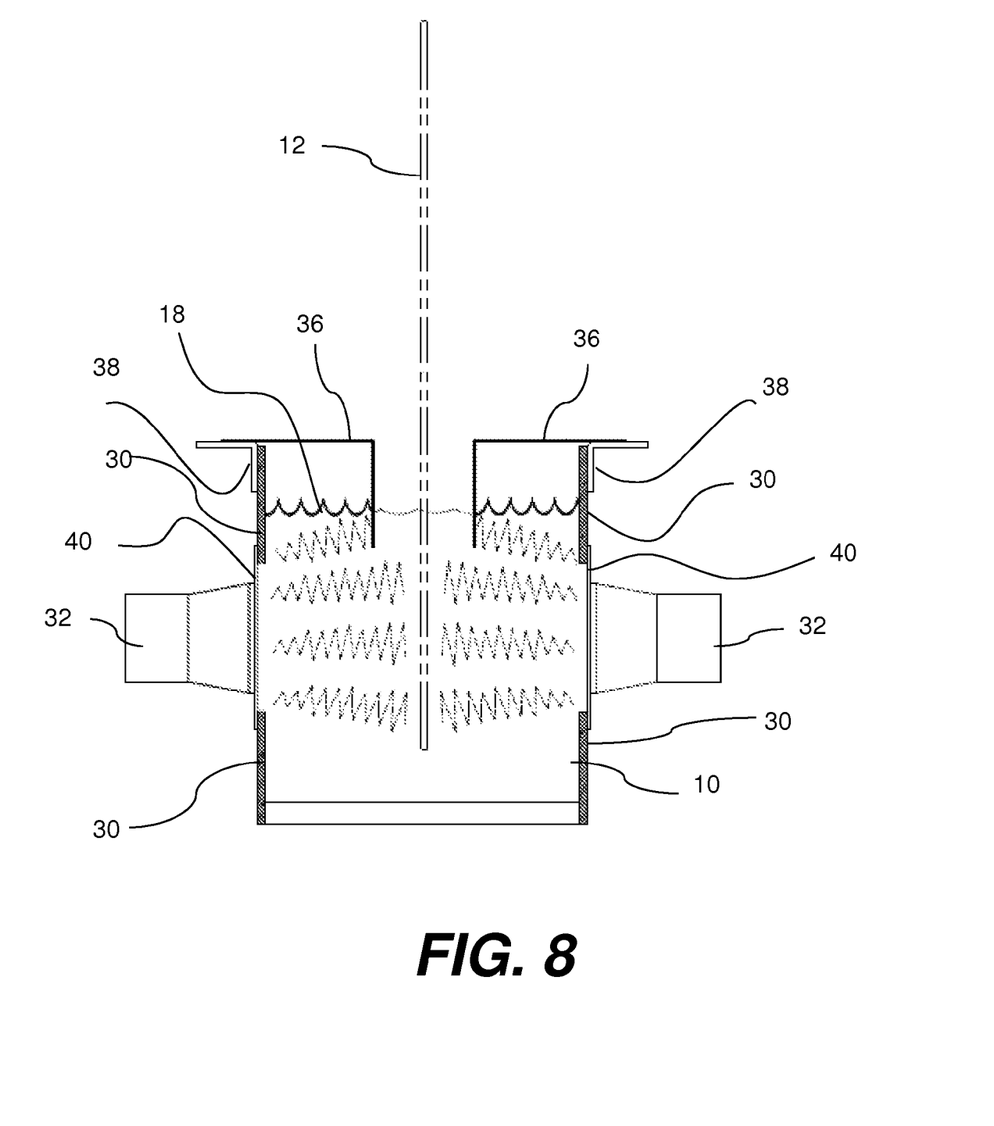
FIG. 8 is a simplified partial lateral cross sectional view of the record cleaner of FIG. 1, showing the liquid basin and ultrasonic transducers attached to an elastomeric portion of the basin.

Referring to FIGS. 4 & 8, the basin 10 can comprise a solid wall portion 38, to which a non-rigid flexible wall 30 that is easily manually bent, such as an elastomeric wall 30, is attached. The elastomeric wall 30 can also be attached to a solid plate, or metal plate 40, and can have an opening to allow liquid in the basin 10 to contact the metal plate 40, to which one or more ultrasonic transducers 32 can be attached. That is, as shown in FIGS. 4 & 8, in some embodiments, two transducers 32 are attached to each metal plate 40, with a metal plate 40 attached to an elastomeric wall 30, on each side of the basin 10, such that a total of four (4) transducers 32 are provided. In some embodiments, more or less transducers 32 can be provided.

The metal plates 40 to which the transducers 32 are attached, can float in the sense that they are movable, as the outer perimeter's of the metal plates are attached to the elastomeric wall 30, which can serve as the only support for the metal plates 40. As such, mechanical vibration of the transducers can be absorbed by the elastomeric wall 30, and reduced for the remainder of the record cleaner 2, such as the casing 4. This can have a substantial benefit in noise reduction and annoying vibrations that would otherwise emanate from the record cleaner 2. This is one factor that allows the use of four or more ultrasonic transducers 32, while maintaining tolerable levels of noise and vibration.

Furthermore, without being bound by theory, attachment of the ultrasonic transducers 32 to the elastomeric wall can help increase efficiency of use of the power, as less power loss is experienced from transfer of energy to vibration of the overall record cleaner 2 (e.g., casing 4 and other parts), as will be appreciated by those skilled in the art after reviewing this disclosure.

In some embodiments, each of the transducers 32 are 50 W ultrasonic transducers, as will be appreciate by those skilled in the art after reviewing this disclosure. In other embodiments, the ultrasonic transducers can be higher or lower watt transducers.

Referring to FIG. 8, in some embodiments, wave dampeners or guards 36 are disposed near a top edge portion of the basin 10 and can be rigid structures (in other embodiments, the guards could be flexible or elastomeric, but have a relaxed structure as shown, and have a natural bias toward the relaxed structure). As shown in FIG. 8, the wave dampeners 36 can be wall structures attached to top portions of the basin 10, and can extend inward, then downward to contact the liquid 18, to block or shield the record from at least a portion of the surface of the liquid 18. The wave dampeners 36 can extend the full longitudinal length of the basin 10 on either side thereof. The applicant(s) have observed through inventiveness and experimentation, that introducing the wave dampener 36 can reduce wear and tear of the record during ultrasonic cleaning, without impairing, or significantly impairing, cleaning performance. Without being bound by theory, it is believed that the interface between the surrounding atmosphere (e.g., air) and the liquid, is a location at which contact between water droplets or bubbles and the record, can cause the most damage (as compared with contact between the water bubbles and record beneath the water surface).

Use of the wave dampeners 36 allows the utilization of more power during the cleaning cycle, such as, for example, the about 200 Watts of power generated through the use of four (4) 50 Watt ultrasonic transducers, while controlling damage to the record surface. The applicant(s) observe that without the wave dampeners, damage to the surface of the records can be accelerated. In some embodiments, more power is provided than 200 watts during ultrasonic cleaning, and in other embodiments, less power is used.

Also, the position of the ultrasonic transducers 32 on either side of the record's position, can help increase cleaning efficiency, by directing energy directly toward a surface of the record, as opposed to systems in which the transducers are placed below the record, in which case, compression waves may run parallel to a surface of the record and be less effective in cleaning.

Figure 9:
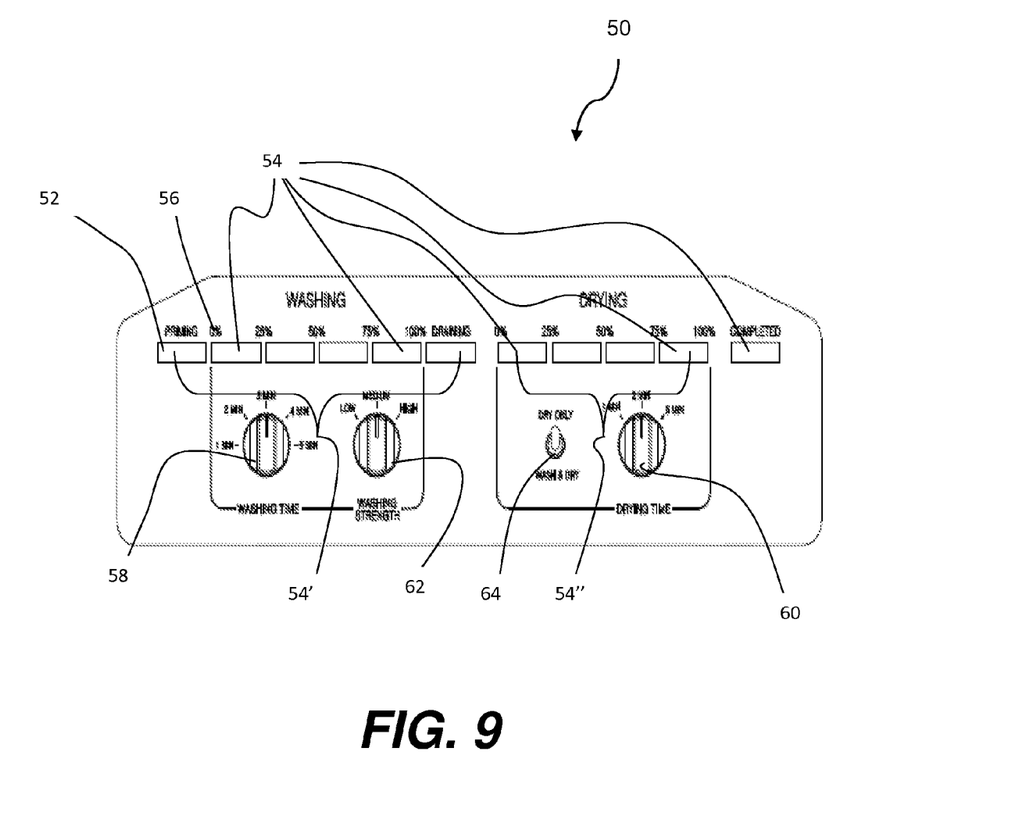
FIG. 9 is a side elevation view of an embodiments of a user interface for use in operating the record cleaner of FIG. 1.

In some embodiments of the present disclosure, a user interface is provided 50, such as that shown in FIG. 9. The user interface can include an LED bar 52, having window sections 54 aligned in series with one or more LEDs behind each window. During a cleaning cycle, as the cycle progresses, the LED bars can sequentially emit light from left to right, corresponding to a present period of the cleaning cycle, until the last LED bar is lighted on the right, signifying a completion or last period in the cleaning cycle. In some embodiments, there are two distinct portions of the cleaning cycle, one washing, and one drying, as represented by indicia in the user interface as shown in FIG. 9. A series of LED bars 54', 54", can be provided for each portion of the cleaning cycle (e.g., washing portion of the cleaning cycle and drying portion of the cleaning cycle), and can be marked with indicia 56 representing an approximate period remaining, or progressed, within the portion of the cycle. For example, as shown in FIG. 9, the indicia 56 for the LED bars can represent percent (%) complete for the portion of the cycle.

Still referring to FIG. 9, the user can adjust a total time of each portion of the cycle using knobs 58, 60 that can be adjusted to correspond to total time (e.g., minutes) in each portion of the cycle. Also, for the washing cycle, a strength of the cycle can be selected using a knob 62 to adjust the strength to corresponding indicia (e.g., low, medium, and high). The strength of the cycle can be controlled by variable power transducers (with power level corresponding to the selected indicia), or by activating only a particular number of the transducers during washing. Also, in some embodiments, drying strength can be manually selected using a control member (not shown), such as a knob, as will be appreciated by those skilled in the art after reviewing this disclosure.

Still referring to FIG. 9, a switch 64 can be provided on the user interface 50 that allows a user to select drying only, or wash and dry. If washing and drying is selected, the cleaning cycle can automatically start with washing and progress to the drying cycle. Also, in other embodiments, the switch, or additional switches, can be used to select washing only, in which case, the cleaning cycle would stop after washing.

Referring to FIGS. 1 and 7, in some embodiments, a user fills the liquid basin 10 using a container 9 having a cleaning liquid (e.g., water, a cleaning fluid other than water, or a mixture of water and a cleaning fluid). The liquid can run down into the reservoir when the pump 26 is off. A user can observe a window 11 in the casing 4 marked with a fill level to direct the user as to when to stop filling the reservoir. Thereafter, the user can make adjustments as desired using the user interface 50. The user then places a record in the slot 6. In some embodiments, a cycle is automatically initiated when the user places a record in the slot 6, such as by a switch activated when the record is placed into the slot, while in other embodiments, a user can be required to manually activate the record cleaner 2 to initiate a cycle, as will be appreciated by those skilled in the after reviewing this disclosure.

When a wash cycle is initiated, pump 26 can pump liquid 18 from the reservoir 24 into the basin 10. When the liquid reaches the run-off level at port opening 20, it begins to overflow back into the reservoir. However, pump 26 can continue to pump 26 water to maintain this level in the basin 10. At the same time, a level sensing switch 19, such as that shown in FIG. 2, can be set to activate when the liquid reaches the run-off level, and when activated, actuates the ultrasonic transducer 32 to generate compression waves and/or cavitation in the liquid in the basin 10. Liquid in the basin 10 then agitates against a surface of the record 12 via various mechanisms, including, for example, the compression waves and/or cavitation. However, an interface of the surface of the liquid, is at least partially guarded by the waver dampeners 36, so that liquid that leaves the surface strikes the wave dampener 36 instead of the record, and a liquid surface that exists on the inside of the waver dampener 36 wall structure, in contact with the record, can exhibit reduced turbulence and other activity, due to the energy from the transducers being dampened before reaching that portion of the liquid surface.

As the wash cycle progresses, the LED bars light up sequentially on the user interface to signify percent of cycle completed. At completion of the wash cycle, the pump 26 can stop automatically, and allow liquid to drain back down in the reservoir 24, emptying the basin 10.

Figure 10:
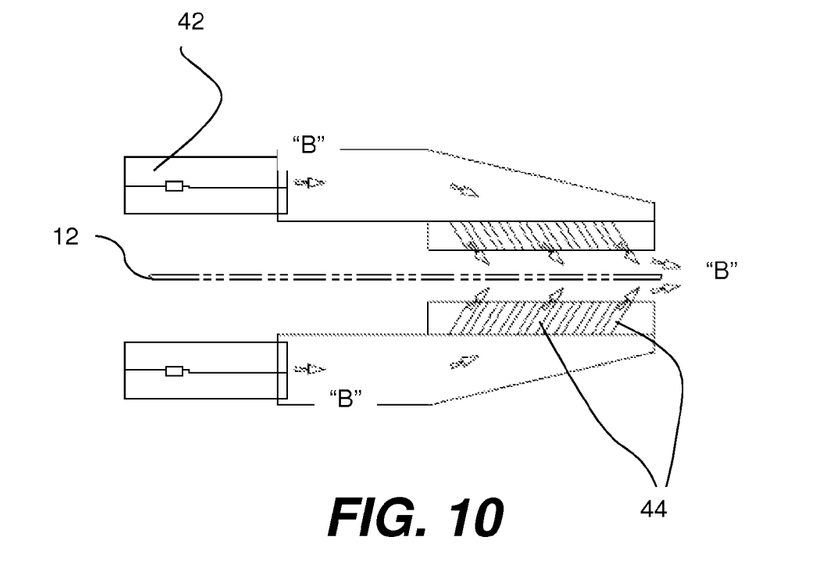
FIG. 10 is a partial top plan view showing a blower system for the record cleaner of FIG. 1.
Figure 11:
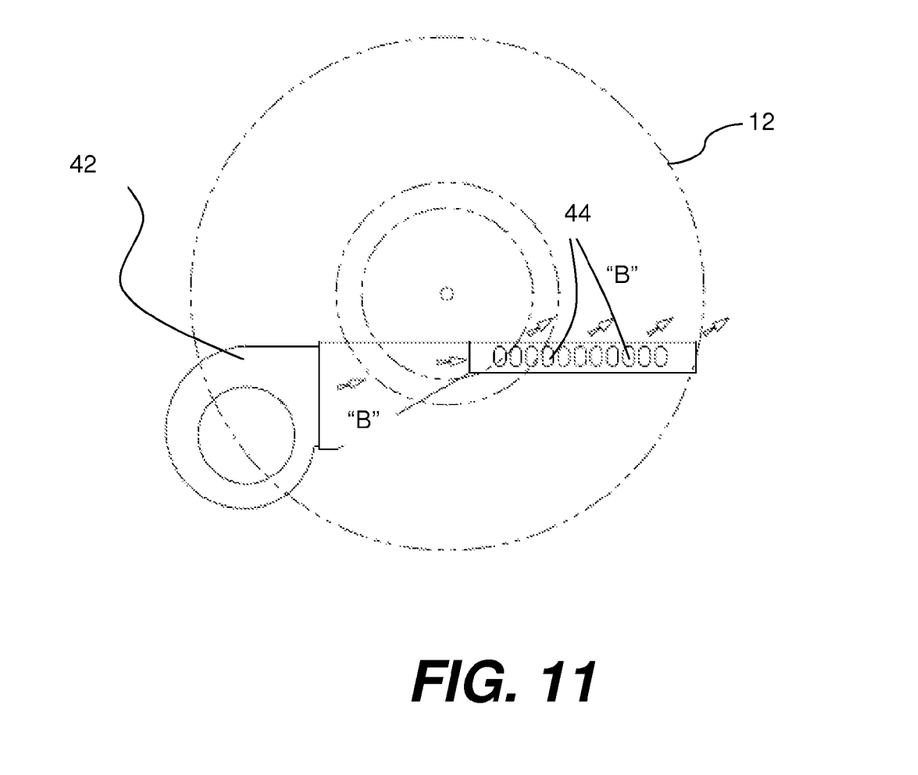
FIG. 11 is a partial side elevation view showing a portion of the blower system of FIG. 10.

In some embodiments, blowers 42 are provided, as shown in FIGS. 4, 10, and 11. During the drying cycle and washing cycle, the motorized roller(s) 14' can cause the record 12 to rotate. During the drying cycle, the blowers 42 are actuated and blow air generally (or about) in the directions of arrows "B." The air can be heated, through a conduit and blown through a plurality of nozzles 44 directed at a surface of the record, while the record rotates.

In some embodiments of the present disclosure, a heat exchange system, or apparatus, such as, for example, a radiator (illustrated in simplified form as 22A in FIG. 6) can be installed or connected to the record cleaner 2. In some embodiments, a fluid slip line can be taken from the record cleaner and pumped through the heat exchanger, such as, for example, at the run-off line 22. Various other locations in the record cleaner may also serve as port points for the slip line for use in cooling.

Although specific embodiments and examples of the disclosure have been described supra for illustrative purposes, various equivalent modifications can be made without departing from the spirit and scope of the disclosure, as will be recognized by those skilled in the relevant art after reviewing the present disclosure. The various embodiments described can be combined to provide further embodiments. The described devices and methods can omit some elements or acts, can add other elements or acts, or can combine the elements or execute the acts in a different order than that illustrated, to achieve various advantages of the disclosure. These and other changes can be made to the disclosure in light of the above detailed description.

In general, in the following claims, the terms used should not be construed to limit the claimed invention(s) to the specific embodiments disclosed in the specification. Accordingly, the scope of invention is determined entirely by the following claims.

What is claimed is:

1. A record cleaner comprising:
    a case having a slot-like opening within which to vertically place a record for cleaning;
    rollers for rotating the record during a washing or drying cycle;
    a liquid basin into which the record partially extends when placed in the slot-like opening, the liquid basin having a sidewall comprising a vertically extending elastomeric wall portion and a vertically extending rigid wall portion, with at least a section of the rigid wall portion disposed above the elastomeric wall portion;
    wherein at least one ultrasonic transducer is connected to a solid plate member which is in turn connected to the elastomeric wall portion at a vertical location in the liquid basin that is above a bottom of the liquid basin; and
    wherein a dampening structure is positioned near a top portion of the liquid basin connected to the rigid wall portion, the dampening structure extending laterally inward above a liquid run-off level within the liquid basin toward a record face position, and then extending vertically downward into the liquid basin below the liquid run-off level within the liquid basin, but not extending to the bottom of the liquid basin.

2. The record cleaner of claim 1 further comprising a user interface for displaying a current period of a washing or drying cycle.

3. The record cleaner of claim 2 wherein the user interface allows a user to select a cycle or combination of cycles.

4. The record cleaner of claim 2 wherein the user interface allows a user to select a strength for at least one of the cycles.

5. The record cleaner of claim 1 further comprising a liquid reservoir in fluid communication with the liquid basin.

6. The record cleaner of claim 5 wherein the liquid reservoir is disposed below the liquid run-off level of the liquid basin.

7. The record cleaner of claim 6 wherein the run-off level is positioned below a level at which a record label is disposed when a record is placed in the record cleaner.

8. The record cleaner of claim 1 wherein the at least one ultrasonic transducer produces about 200 watts of ultrasonic power.

9. The record cleaner of claim 1 comprising four ultrasonic transducers.

* * * * *